(12) United States Patent
Proidl

(10) Patent No.: US 7,945,635 B2
(45) Date of Patent: May 17, 2011

(54) INTERNET RECEIVING ARRANGEMENT HAVING QUALITY TEST MEANS

(75) Inventor: Adolf Proidl, Vienna (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 3066 days.

(21) Appl. No.: 09/954,654

(22) Filed: Sep. 18, 2001

(65) Prior Publication Data

US 2002/0049849 A1    Apr. 25, 2002

(51) Int. Cl.
*G06F 15/16* (2006.01)

(52) U.S. Cl. .......................... 709/217; 709/227

(58) Field of Classification Search .................. 709/224, 709/227, 217; 702/186; 725/37; 348/578
See application file for complete search history.

(56) References Cited

U.S. PATENT DOCUMENTS

| | | | |
|---|---|---|---|
| 5,227,863 A * | 7/1993 | Bilbrey et al. | 348/578 |
| 6,522,995 B1 * | 2/2003 | Conti et al. | 702/186 |
| 6,738,813 B1 * | 5/2004 | Reichman | 709/224 |
| 2002/0059592 A1 * | 5/2002 | Kiraly | 725/37 |
| 2005/0271071 A1 * | 12/2005 | Madhavapeddi et al. | 370/412 |

OTHER PUBLICATIONS

"Kerbango Radio", 2000, pp. 1-3.*
Specification AT 000025 EP-P, "Datenstromanpassungsserver" pp. 1-15 and drawings.
Kerbango Radio, Kerbango Resources, internet address: www.kerbango.com—pp. 1-3.

* cited by examiner

*Primary Examiner* — Karen C Tang
(74) *Attorney, Agent, or Firm* — Edward W. Goodman

(57) ABSTRACT

An Internet receiving arrangement, such as an Internet radio, is connected to the Internet and stores internet addresses of information servers which provide information data. The internet receiving arrangement has a quality test device for testing whether the received information data have a satisfactory quality. If the quality value of the received information data detected by the quality detector is below a quality threshold value, then the internet addresses stored in the internet receiving arrangement are updated with internet addresses of the information servers which are stored in an address server connected to the internet.

20 Claims, 1 Drawing Sheet

INTERNET RECEIVING ARRANGEMENT HAVING QUALITY TEST MEANS

Figure 1:
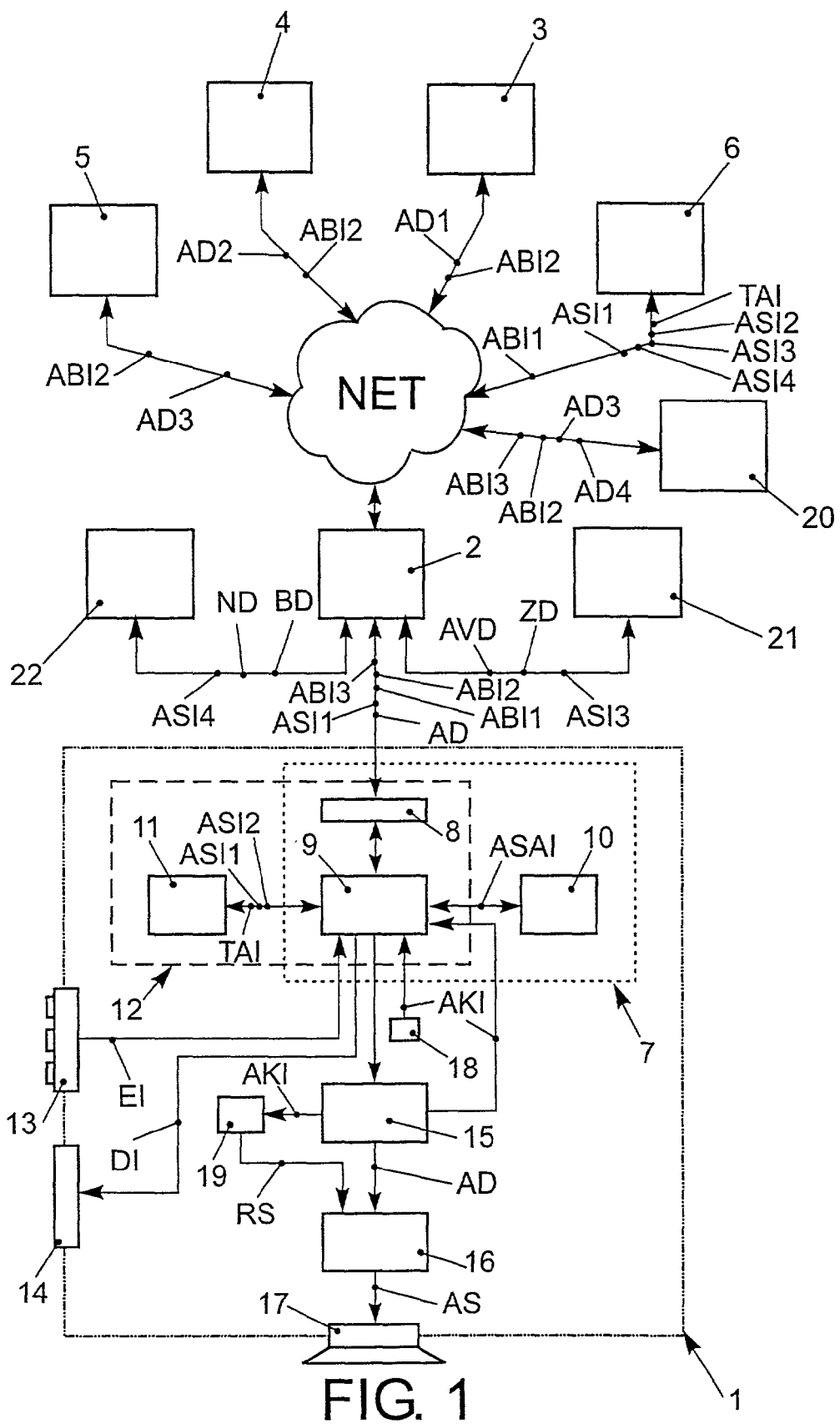

The invention relates to an internet receiving arrangement for receiving information data stored in information servers connected to the internet, and for reproducing the received information data.

Such an internet receiving arrangement of the type defined in the opening paragraph has been put on the market by the Kerbango company. The known internet radio has retrieval means by which the internet radio can be connected to the telephone line. Each time that the internet radio is turned on by a user the retrieval means dial the telephone number of a local service provider, which provides access to the internet. Once access to the internet has been established after a connection time upon turn-on of the internet radio, the retrieval means retrieve collective address information from an address server connected to the internet.

The address server is operated by the Kerbango company. The internet address of the address server has already been stored in the retrieval means of the internet radio during the manufacture of the internet radio. The address server stores the collective address information of information servers which store encoded and non-encoded audio data that can be processed by means of the internet radio. The address server checks at periodic test instants whether audio data that can be processed by the internet radio can still be received from the information servers identified by the stored collective address information.

For this purpose, the address server has quality test means which are adapted to check whether the audio data received from the information servers identified by the stored collective address information exceeds a quality threshold value at the test instant. When the quality of the tested audio data exceeds the quality threshold value the detected quality value is stored in the address server in conjunction with the address information of this information server and is supplied to the internet radio upon request. When the quality of the tested audio data is below the quality threshold value the label "Server Down" is stored with the address information of this information server and is supplied to the internet radio upon request.

It has proved to be a disadvantage of the known internet radio that after the internet radio has been turned on the user should first wait until the connection time for establishing the connection with the internet and subsequently an address retrieval time for retrieving the collective address information from the address server have expired before the desired audio data can be retrieved from the information server and can finally be reproduced acoustically for the user.

It has proved to be another disadvantage that if, for example as a result of transmission problems, the quality value of the audio data retrieved from an information server identified by the collective address information is below the quality threshold value or if, as a result of a change of the address information of the information server since the last test instant, no audio data at all can be received, the user yet receives an indication of the satisfactory quality value of the audio data by means of the internet radio but the internet radio does not produce any sound.

It is an object of the invention to provide an internet receiving arrangement which precludes the aforementioned disadvantages. In order to achieve this object characteristic features in accordance with the invention are provided in such an internet receiving arrangement, in such a manner that the internet receiving arrangement can be characterized in the manner defined hereinafter.

An internet receiving arrangement for receiving information data stored in information servers connected to the internet, the arrangement having address retrieval means which, when activation information is present, are adapted to retrieve collective address information from an address server connected to the internet, the collective address information identifying those information servers from which information data processable by the internet receiving arrangement can be retrieved, and having information retrieval means for retrieving the processable information data from an information server identified by the retrieved collective address information, and having quality test means for testing the information data retrieved and received by the information retrieval means and for supplying the activation information to the address retrieval means when the quality of the received information data is below a quality threshold value or when no information data processable by the internet receiving arrangement are received from the information server.

Thus, it is achieved that the internet receiving arrangement continually monitors the quality of the received information data and need only retrieve the current collective address information from the address server if no information data or only information data of poor quality are received. As a result of this, a usually unnecessary retrieval of address information can be avoided, which has the advantage that both data transmission costs are saved and also that the address retrieval time after turn-on of the internet receiving arrangement is eliminated.

In one embodiment, timer means of the internet receiving arrangement supply activation information to the address retrieval means, for example once a day or once every weekend, in order to update the collective address information stored in the address retrieval means in accordance with the collective address information retrieved from the address server.

In another embodiment, the user can also manually enter address information for an information server which has been ignored by the operator of the address server.

The internet receiving arrangement may also be adapted to make use of transcoding services offered by a transcoding server. The transcoding server transcodes the information data encoded in accordance with an encoding method, which cannot be handled by the internet receiving arrangement, into information data encoded in accordance with a second encoding method, which can be handled by the internet receiving arrangement. This yields the advantage that the internet receiving arrangement can reproduce a greater number of different information data.

The user may also receive feedback when the information data from the information server selected by him cannot be reproduced with satisfactory quality.

The internet receiving arrangement may also retrieve address information of a plurality of address servers, as a result of which the user has the advantage that he can choose from a larger number of broadcasting stations and other stations.

The aforementioned aspects as well as further aspects of the invention will be apparent from the example of an embodiment described hereinafter and will be elucidated with the aid of this example.

The invention will be described in more detail hereinafter with reference to an embodiment which is shown in the drawing by way of example but to which the invention is not limited.

FIG. 1 shows an internet radio capable of reproducing radio programs from radio stations, which programs are provided by information servers connected to the internet.

FIG. 1 shows an internet radio 1 connected to the internet NET via a service provider 2. A multitude of information servers, which are represented by a first information server 3, a second information server 4 and a third information server 5. Information data, formed by audio data AD of radio programs of a plurality of radio stations, can be retrieved from the information servers 3, 4 and 5 in a continuous data stream.

Thus, it is possible to retrieve first audio data AD1 of the radio station "OE3" from the first information server 3, second audio data AD2 of the radio station "CNN-Radio" from the second information server 4 and third audio data AD3 of the radio station "DE-Radio" from the third information server 5. The first audio data AD1 and the second audio data AD2 have been encoded in accordance with a "Real Audio" encoding method and the third audio data AD3 have been encoded in accordance with an "MP3" encoding method. The "Real Audio" encoding method and the "MP3" encoding method are generally known, for which reason they will not be described in more detail.

Furthermore, an address server 6 is connected to the internet NET and is adapted to store the internet addresses of such information servers, from which information data of a given type (audio data, video data, text data, . . . ) and with a given coding can be retrieved because these information data are made available by these information servers. Once every six hours, using given search criteria, the address server 6 performs a scan for new information servers which are connected to the internet NET and which also provide information data of said given type and coding. The address server stores the internet address of an information server thus found together with the internet addresses found until now as collective address information ASI. The address server 6 also checks whether the internet addresses stored as the collective address information ASI are still valid. This periodic scan may also be supported by an administrator of the address server 6.

The address server 6 is operated by the manufacturer of the internet radio 1 and makes it possible for the internet radio 1 through the retrieval of the stored collective address information ASI to find those information servers on the internet NET which provide information data which can be processed by the internet radio 1. For this purpose, the address server 6 stores the internet addresses of the first information server 3 and the second information server 4 as first collective address information ASI1, from which servers audio data AD from radio stations are available encoded in accordance with the "Real Audio" encoding method. Furthermore, the address server 6 stores the internet address of the third information server 5 as second collective address information ASI2, from which server third audio data AD3 of the radio station "DE-Radio" is available encoded in accordance with the "MP3" encoding method.

The internet radio 1 now includes address retrieval means 7 adapted to retrieve the first collective address information ASI1 from the address server 6 when activation information AKI is present. For this purpose, the address retrieval means 7 include an interface 8, controller means 9 and address server memory means 10. The interface 8 is connected to the service provider via a dedicated data line and is adapted to execute an ethernet protocol, as is generally known.

Upon the first plug-in to the dedicated data line the interface 8 transmits the ethernet card number of the interface 8 to the service provider 2 in accordance with the ethernet protocol. Subsequently, the service provider 2 assigns an INPUT address to the internet radio 1 and transmits this to the interface 8 in accordance with the HDC protocol. From this instant retrieval information is transmitted in accordance with the TCP/INPUT protocol at 100 Mbit/s. As a result of this, there will be no time delays in the retrieval of information from the internet NET which are caused by the build-up of the connection between the internet 8 and the service provider 2, as would be the case for a telephone connection using a modem as interface. This log-in procedure and method of transferring information via the dedicated data line are known since long and are not relevant in connection with the invention, for which reason the subject is not described in more detail.

During the production of the internet radio 1 the internet address of the address server 6 has been stored in the address server memory means 10 in order to enable a retrieval of collective address information ASI updated by the manufacturer. The activation information AKI can be applied to the controller means 9, in order to read the internet address of the address server 6 from the address server memory means 10 and in order to generate first retrieval information ABI1. The generated first retrieval information ABI1 identifies the apparatus type of the internet radio 1 and can be transferred to the address server 6 via the interface 8, the service provider 2 and the internet NET.

Upon receipt of the first retrieval information ABI1 the address server 6 is adapted to detect the collective address information ASI which identifies information servers which provide information data of the type and coding which can be processed by the internet radio 1. The detected collective address information ASI also includes the names of the radio stations available via the information servers identified by the collective address information ASI.

The first collective address information ASI1 detected by the address server 6 can be transferred from the address server 6 to the internet radio 1 via the internet NET and the service provider 2. The first collective address information ASI1 received by the controller means 9 via the interface 8 can be stored in information server memory means 11 of the internet radio 1. The information server memory means 11, the interface 8 and the controller means 9 thus form information retrieval means 12 for retrieving information data which can be processed by the internet radio 1, as will be described in greater detail hereinafter.

The internet radio 1 further has a keypad 13 and a display 14. By the actuation of keys of the keypad 13 a user of the internet radio 1 can choose a radio station from a selection of radio stations. For this purpose, the display 14 displays the names of the radio stations identified by the first collective address information ASI1 stored in the information server memory means 11. When the user of the internet radio 1 has selected a radio station entry information EI identifying this selected radio station can be transferred from the keypad 11 to the controller means 9.

Upon reception of the entry information EI the controller means 9 are adapted to generate second retrieval information ABI2, which identifies the selected radio station and the internet address of the information server which provides the audio data AD from this radio station. This second retrieval information ABI2 can be transferred from the controller means 9 to the information server, which is identified by the internet address in the second retrieval information ABI2, via the interface 8, the service provider 2 and the internet NET. Subsequently, this information server supplies the audio data from the radio station identified by the second retrieval information ABI2 to the internet radio 1 as a continuous data stream.

The internet radio 1 now includes quality test means 15 for testing the audio data AD requested and received by the information retrieval means 12 and to supply the activation information AKI to the controller means 9 when the quality of the received audio data AD fall below a quality threshold value or when the information server does not receive any audio data AD which can be processed by the internet radio.

The quality threshold value may then be defined as a given jitter value or a given packet failure rate. The packet failure rate is a percentage of the data packets expected in the continuous data stream of received audio data AD, which is allowed to be missing before processing of the received audio data AD becomes substantially impossible.

The internet radio 1 further has information processing means 16 adapted to process audio data AD encoded in accordance with the "Real-Audio" encoding method. For this purpose, the information processing means 16 inter alia include a FLASH RAM as buffer memory for the storage of received audio data AD, the storage capacity of the buffer memory allowing a reproduction of maximum 4 seconds of audio from the buffer memory. The jitter value indicates how strongly the data transfer rate (for example 100 Mbit/s ⇆2 Mbit/s) of the received continuous data stream is allowed to fluctuate so as to guarantee a continuous audio reproduction with the storage capacity of the buffer memory.

When the test by the quality test means 15 reveals that the quality of the received audio data AD exceeds the quality threshold value the quality test means 15 supply the encoded audio data AD to the information processing means 16.

When encoded audio data AD are received the information processing means 16 are adapted to decode the encoded audio data AD, the decoded audio data being applied to a D/A converter of the information processing means 16. An analog audio signal AS supplied by the D/A converter is subsequently amplified and applied from the information processing means 16 to a loudspeaker 17 of the internet radio 1.

The operation of the internet radio 1 and its advantages will be elucidated hereinafter with reference to a first example of use of the embodiment shown in FIG. 1. In the example of use it is assumed that the user wishes to listen to a radio program of the radio station "CNN-Radio" and selects this radio station by actuating keys of the keypad 13. Thereupon, entry information EI which identifies this radio station "CNN-Radio" is applied from the keypad 13 to the controller means 9. The controller means 9 subsequently read the first collective address information ASI1, which has already been retrieved from the address server 6 and stored in the information server memory means 11 the day before, and determine the internet address of the second information server 4, which provides the second audio data AD2 from the radio station "CNN-Radio".

The controller means 9 subsequently transfer the second retrieval information ABI2, which identifies the radio station "CNN-Radio" to the second information server 4 via the internet NET. Subsequently, the second information server 4 supplies the second audio data AD2 from the radio station "CNN-Radio" to the internet radio 1 as a continuous data stream. It is assumed that the quality of the received second audio data AD2 is satisfactory, as a result of which the second audio data AD2 are transferred from the quality test means 15 to the information processing means 16 and the current radio program of the radio station "CNN-Radio" is acoustically reproduced by the loudspeaker 17.

This has the advantage that radio programs made available by an information server connected to the internet can be reproduced by the internet radio 1 in a particularly simple manner. This makes it possible that each time that another radio station is selected by the user the internet radio 1 need not retrieve the first collective address information ASI1 from the address server 6. This saves an unnecessary data transfer, which would raise the costs for the user. Another advantage is obtained in that time is saved for the user, who does not have to wait for the retrieval of the collective address information upon each change of radio station. However, this is particularly advantageous if at that time, for example for technical reasons, the first collective address information ASI1 is not retrievable from the address server 6.

In a second example of use of the embodiment it is now assumed that the internet address of the first information server 3, which provides the audio data AD1 of the radio station "OE3", has been changed. Furthermore, it is assumed that by actuating the keys of the keypad 13 the user selects the radio station "OE3" in order to listen to the current radio program of the radio station "OE3". However, the first collective address information ASI1, which has been retrieved from the address server 6 and stored by the information server memory means 11 the day before, still contains the old internet address of the first information server 3, which address is no longer valid.

The information retrieval means 12 subsequently attempt to retrieve the first audio data AD1 from the first information server 3, as described for the first example of use. Since the internet address of the first information server 3 is no longer valid, the information retrieval means 12 do not receive audio data AD, which is detected by the quality test means 15. In response thereto, the quality test means 15 supply the activation information AKI to the controller means 9 in order to cause the first collective address information ASI1 stored in the information server memory means 11 to be updated.

As described hereinbefore, the controller means 9 read the internet address of the address server 6 from the address server memory means 10 and retrieve the updated first collective address information ASI1 from the address server 6. The retrieved first collective address information ASI1 is subsequently stored in the information server memory means 11 and the controller means 9 derive the new internet address of the first information server 3 from the first collective address information ASI1.

Subsequently, the controller means 9 generate further second retrieval information ABI2, which now contains the correct internet address of the first information server 3. The continuous data stream of first audio data AD1 now supplied by the first information server 3 is now tested by the quality test means 15. The test reveals that the quality of the first audio data AD1 is satisfactory, as a result of which the first audio data AD1 are acoustically reproduced after processing by the information processing means 16.

This has the advantage that in the case of a problem with the requested audio data the internet radio 1 automatically retrieves the updated collective address information ASI from the address server 6 so as to enable the acoustic reproduction of the radio program desired by the user.

It is to be noted that it may be advantageous if, after retrieval of the updated collective address information ASI from the address server 6, the collective address information ASI is not stored immediately in the information server memory means 11 but first the quality of the information data retrieved from the information server identified by the collective address information ASI is checked by the quality test means 15. The updated internet address of the information server is then stored in the information server memory means 11 only after it has been ascertained that the quality value of the retrieved information data lies above the quality threshold value.

The internet radio 1 further has timer means 18, which supply activation information AKI to the controller means 9 at an activation instant once every day, for example at 23:30 hours. Subsequently, the address retrieval means 7 retrieve the current first collective address information ASI1 from the address server 6 and store this in the information server memory means 11.

This has the advantage that the current collective address information ASI is periodically updated in the information server memory means 11. Thus, the user can also select those radio stations which have become available from an information server for the first time only recently, which information server has an internet address which has only recently been included in the collective address information ASI by the address server 6.

By means of the keys of the keypad 13 it is possible to activate an entry mode of the internet radio 1. In the entry mode the user of the internet radio 1 can manually enter the internet address of an information server from which also audio data encoded in accordance with the "Real Audio" encoding method can be retrieved. The manually entered internet address is stored in the information server memory means 11 in addition to the first collective address information ASI1 and advantageously broadens the selection of radio stations available to the user.

The internet radio 1 now further includes noise generator means 19, which when activation information AKI from the quality test means 15 is present are adapted to supply noise information to the information data processor means 16. As noise information an analog noise signal RS is supplied to the information data processing means 16, from which it is applied to the loudspeaker 17 after the amplification of the noise signal RS.

This has the advantage that the user receives feedback if no audio data AD or only audio data AD of poor quality are received from the relevant information server. It is particularly advantageous that the reproduction of noise by the internet radio 1 by way of feedback is already known to the user from normal radios.

Furthermore, a transcoding server 20 is connected to the internet NET, which transcoding server is adapted to transcode or recode third audio data AD3 stored in the information server 5. The transcoding server 20 is adapted to transcode the third audio data AD3, which are encoded in accordance with the "MP3" coding method and which cannot be processed by the internet radio 1, into fourth audio data AD4, which are encoded in accordance with the "Real Audio" coding method and which can be processed by the internet radio 1. Such a transcoding server 20 is known, for example from the European patent application having the application number 00 980 114.2, whose subject matter is incorporated in the disclosure of the present document by reference.

The address server 6 now also stores transcoding address information TAI, which includes the internet address of the transcoding server 20. The transcoding address information TAI further contains the names of the radio stations and the internet addresses of those information servers from which "Real Audio" encoded audio data AD can be received by the internet radio 1 with the aid of the transcoding server 20. This transcoding address information TAI is retrieved from the address server 6 by the address retrieval means 7 together with the collective address information ASI when activation information AKI is present and is stored in the information server memory means 11.

In a third example of use of the embodiment it is now assumed that the user wishes to receive the current radio program of the radio station "DE-Radio" and selects this radio station with the keys of the keypad 13. The controller means subsequently read the second collective address information ASI2 and the transcoding address information TAI from the information server memory means 11 and generate third retrieval information ABI3, which includes the internet addresses of the transcoding server 20 and the third information server as well as the name of the radio station "DE-Radio". The third retrieval information ABI3 is transferred to the transcoding server 20 via the interface 8, the service provider 2 and the internet NET.

Upon reception of the third retrieval information ABI3 the transcoding server 20 supplies the second retrieval information ABI2 to the third information server 5 in order to receive the third audio data AD3 of the radio station "DE-Radio", encoded in accordance with the invention the "MP3" coding method, in a continuous data stream. The transcoding server 20 decodes the received third audio data AD3, encodes these in accordance with the "Real Audio" coding method and transfers the encoded audio data thus obtained to the internet radio 1 as fourth audio data AD4.

Thus, it is advantageously achieved that the internet radio 1 can also reproduce radio programs of radio stations, which are only available from an information server as encoded audio data AD3 which cannot be processed directly by means of the internet radio 1. As a result of this, the internet radio 1 can receive a substantially larger number of radio stations.

FIG. 1 further shows an internet television set 21 connected to the service provider 2. The address server 6 stores third collective address information ASI3, which represents names of television stations and the internet addresses of information servers which provide audio/video data AVD and additional data ZD of these television stations.

The internet television set 21 forms an internet receiving arrangement and also includes quality test means for testing the audio/video data AVD and additional data ZD retrieved and received by the information retrieval means and to supply the activation information to the address retrieval means when the quality of the received audio/video data AVD and/or additional data ZD is below a quality threshold value or when no audio/video data AVD and/or additional data ZD that can be processed by the internet television set 21 are received from the information server. Thus, the advantages of the internet radio 1 described hereinbefore are also obtained with the internet television set 21.

FIG. 1 also shows an internet read apparatus 22, which is also connected to the service provider 2. The address server 6 stores fourth collective address information ASI4, which represents the internet addresses of information servers which provide stock exchange data BD and news data ND as on-line information which can be transmitted continuously.

The internet read apparatus 22 forms an internet receiving arrangement and also includes quality test means for testing the stock exchange data BD and news data ND retrieved and received by the information retrieval means and for supplying the activation information to the address retrieval means when the quality of the received stock exchange data BD and news data ND is below a quality threshold value or when no stock exchange data BD and news data ND that can be processed by the internet read apparatus 22 are received from the information server. Thus, the advantages of the internet radio 1 described hereinbefore are also obtained with the internet read apparatus 22.

It is to be noted that the information server memory means and the address server memory means may be formed by an EEPROM or a hard disk. Furthermore, the controller means may be formed by a microprocessor, the timer means by a timer of the microprocessor and the information processing means by a digital signal processor or a dedicated decoder device (for example an MP3 decoder).

It is to be noted that the address server may also be operated by an arbitrary company and this company could claim fees for the operation of the address server from manufacturers of the internet radio, the internet television set and the internet read apparatus. This provides an interesting method of doing business on the internet.

It is to be noted that information data may be encoded in accordance with a multitude of other coding methods and may, for example, alternatively be encoded in accordance with the "Extendable Markup Language" coding method.

It is to be noted that the internet addresses of a plurality of address serves may be stored in the address server memory means of the internet receiving arrangement. When activation information is present the internet receiving arrangement could then retrieve the current collective address information from that address whose collective address information, which is stored in the information server memory means, contains the internet address of the information server from which the information data of poor quality have been received.

It is to be noted that by the actuation of a key the user may activate an autostore process, in which the current collective address information ASI is retrieved from all the address servers known to the internet receiving arrangement and is stored in the information server memory means. In this autostore process it would alternatively be possible to retrieve from the address server only collective address information with internet addresses of those information servers which have been stored in the address server in conjunction with a given label (for example, "News", "Jazz", . . . ). This has the advantage that only internet addresses of information servers which provide information data relating to "News" or "Jazz" can be stored in the information server memory means.

After this autostore process the user can activate an allocation process of the internet radio 1. In this allocation process the user can allocate individual radio stations contained in the retrieved collective address information ASI to given station keys. Thus, these radio stations can be selected particularly rapidly by the user through actuation of the corresponding station key.

The invention claimed is:

1. An internet receiving arrangement for receiving information data stored in information servers connected to the internet, the arrangement having address retrieval means which, when activation information is present, are adapted to retrieve collective address information from an address server operatively connected to the address retrieval means of the internet, the collective address information identifying those information servers from which information data processable by the internet receiving arrangement can be retrieved, and having information retrieval means for retrieving the processable information data from an information server identified by the retrieved collective address information, and having quality test means for testing the information data retrieved and received by the information retrieval means and for supplying the activation information to the address retrieval means when the quality of the received information data is below a quality threshold value.

2. An internet receiving arrangement as claimed in claim 1, in which timer means have been provided which at periodically occurring activation instants supply the activation information to the address retrieval means in order to retrieve the collective address information.

3. An internet receiving arrangement as claimed in claim 1, in which entry means for the manual entry of the address information of a further information server have been provided from which information data processable by the internet receiving arrangement can be retrieved.

4. An internet receiving arrangement as claimed in claim 1, in which the address retrieval means, when the activation information is present, are adapted to retrieve transcoding address information from the address server, which transcoding address information identifies a transcoding server which is adapted to transcode information data stored in an information server but not processable by the internet receiving arrangement into information data processable by the internet receiving arrangement, and in which the information retrieval means are adapted to retrieve the information data processable by the internet receiving arrangement from the transcoding server identified by the transcoding address information.

5. An internet receiving arrangement as claimed in claim 1, in which noise generator means have been provided, which noise generator means are adapted to supply noise information to information data processing means of the Internet receiving arrangement during the time that the activation information is present.

6. An internet receiving arrangement as claimed in claim 1, in which the address retrieval means, when activation information is present, are adapted to retrieve at least two items of collective address information from at least two address servers connected to the internet.

7. An internet receiving arrangement as claimed in claim 1, which internet receiving arrangement is formed by an internet television set adapted to receive and process audio/video data in the form of information data.

8. The internet receiving arrangement as claimed in claim 1, wherein the information data is audio data.

9. The internet receiving arrangement as claimed in claim 1, wherein the quality is a measure of audio quality data.

10. The Internet receiving arrangement as claimed in claim 1, wherein the information servers are Internet radio stations.

11. An Internet receiving arrangement for receiving information data from information servers that are connected to the internet comprising:
an address retrieval device to selectively retrieve collective address information from an address server, the address retrieval device being operatively connected to the address server only through the Internet, where an activation information device is employed to determine if address information is retrieved;
an information retrieval device configured to retrieve information data from the information servers that are identified by the retrieved collective address information, wherein the collective address information identifies those information servers from which information data is to be retrieved; and
a quality test device arranged to test the information data retrieved and received by the information retrieval device and for supplying the activation information to the address retrieval device if the quality of the received information data is below a quality threshold value.

12. The internet receiving arrangement as defined in claim 11, wherein a timer is provided to supply the activation information to the address retrieval device in order to retrieve the collective address information.

13. The Internet receiving arrangement defined in claim 11, wherein an entry device is provided for entry of the address information of a further information server from information data can be retrieved.

14. The Internet receiving arrangement defined in claim 11, wherein the address retrieval device is adapted to retrieve transcoding address information from the address server, which transcoding address information identifies a transcoding server adapted to transcode information data from an information server but not processable by the internet receiving arrangement into information data processable by the internet receiving arrangement, and in which the information retrieval device is adapted to retrieve the information data processable by the internet receiving arrangement from the transcoding server identified by the transcoding address information.

15. The internet receiving arrangement defined in claim 11, wherein the noise generator is adapted to supply noise information to information data processing means of the internet receiving arrangement during the time that the activation information is present.

16. The Internet receiving arrangement defined in claim 11, wherein the address retrieval device is adapted to retrieve at least two items of collective address information from at least two address servers connected to the internet.

17. The internet receiving arrangement defined in claim 11, wherein the internet receiving arrangement includes an internet television adapted to receive and process audio/video data in the form of information data.

18. The internet receiving arrangement defined in claim 11, wherein the information data is audio data.

19. The internet receiving arrangement defined in claim 11, wherein the quality is a measure of audio quality data.

20. The internet receiving arrangement defined in claim 11, wherein the information servers are Internet radio stations.

* * * * *